W. GRAHAM.
LUMBER STACKING DEVICE.
APPLICATION FILED MAY 3, 1909.
983,891.
Patented Feb. 14, 1911.
5 SHEETS—SHEET 2.
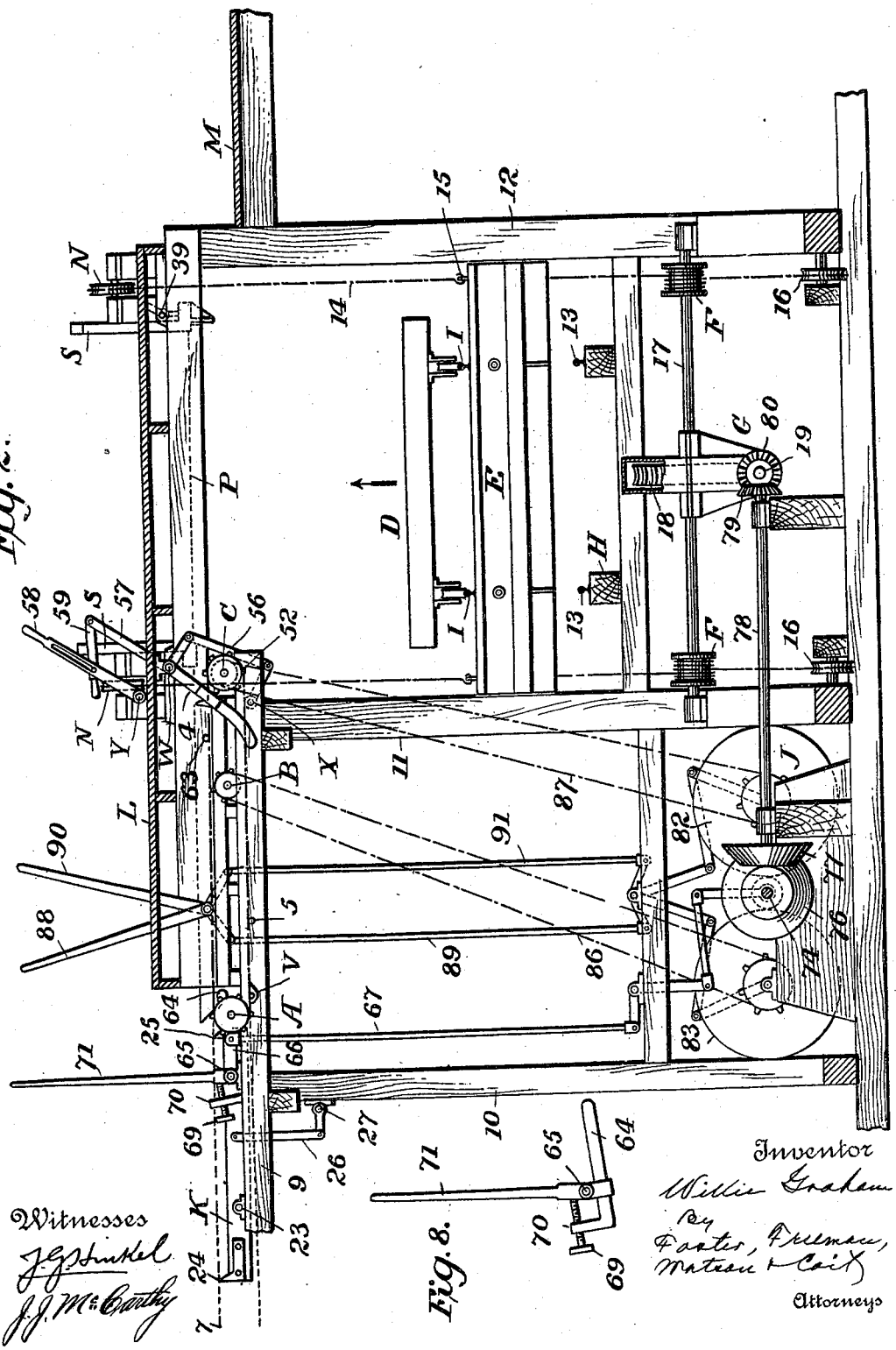

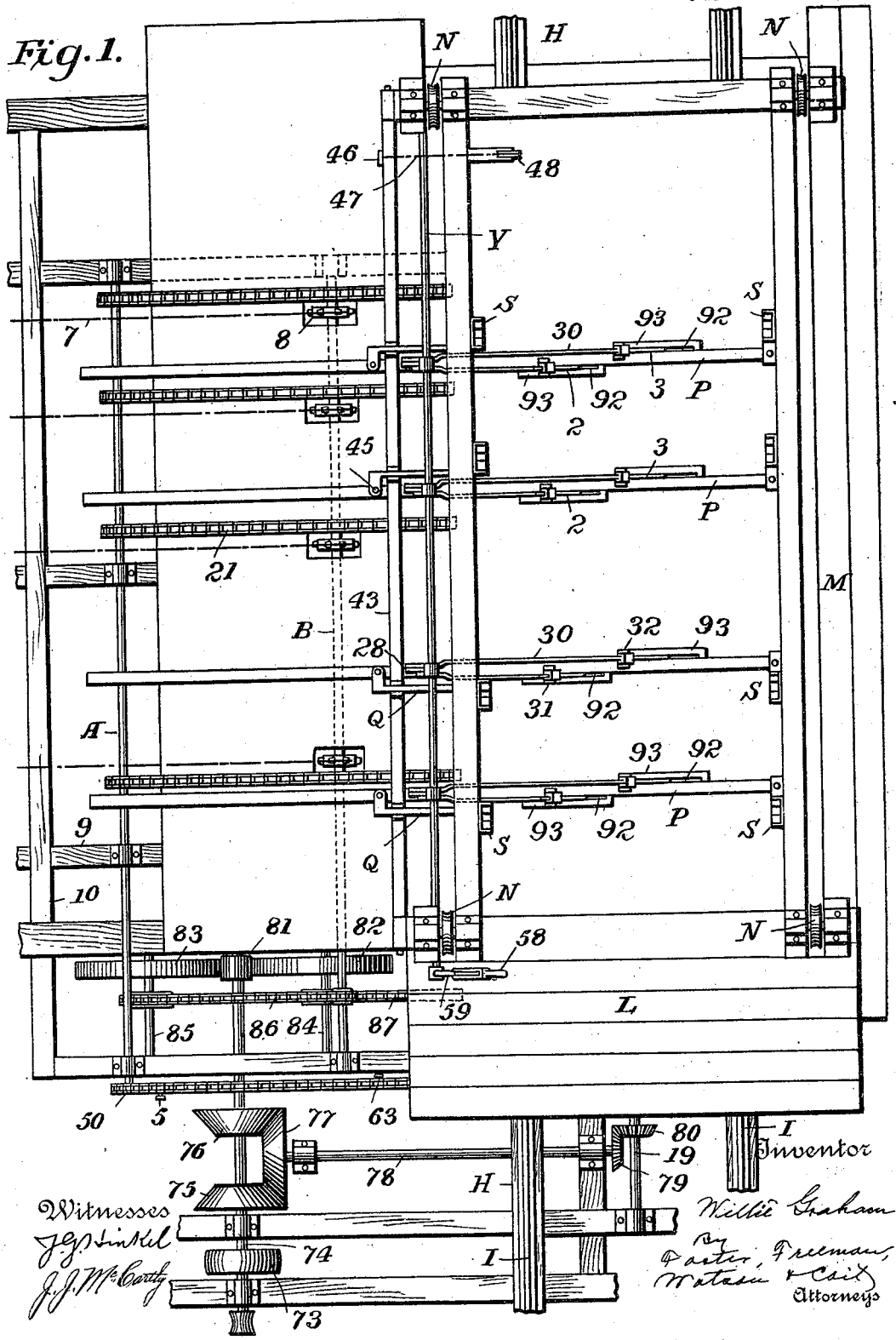

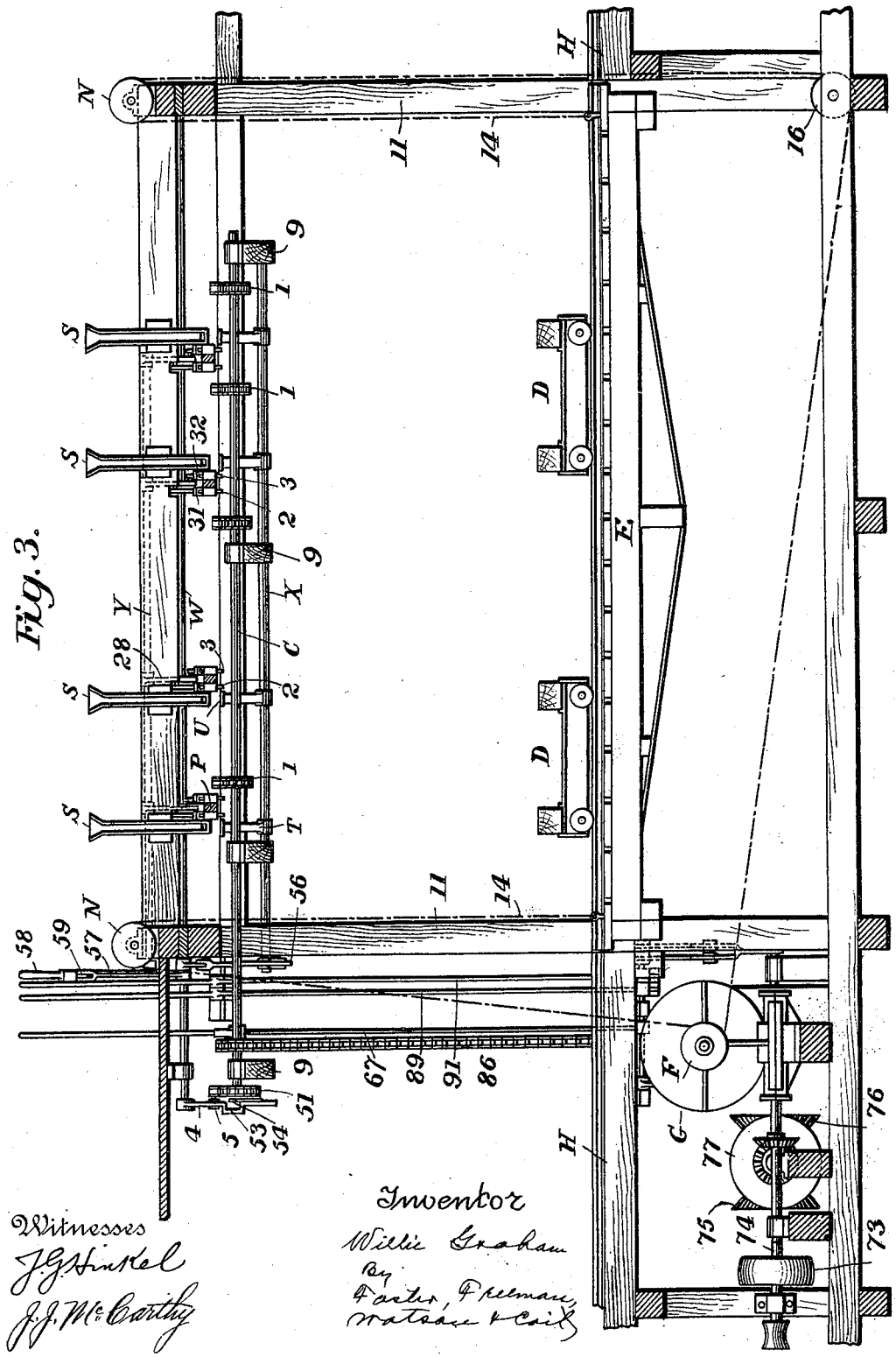

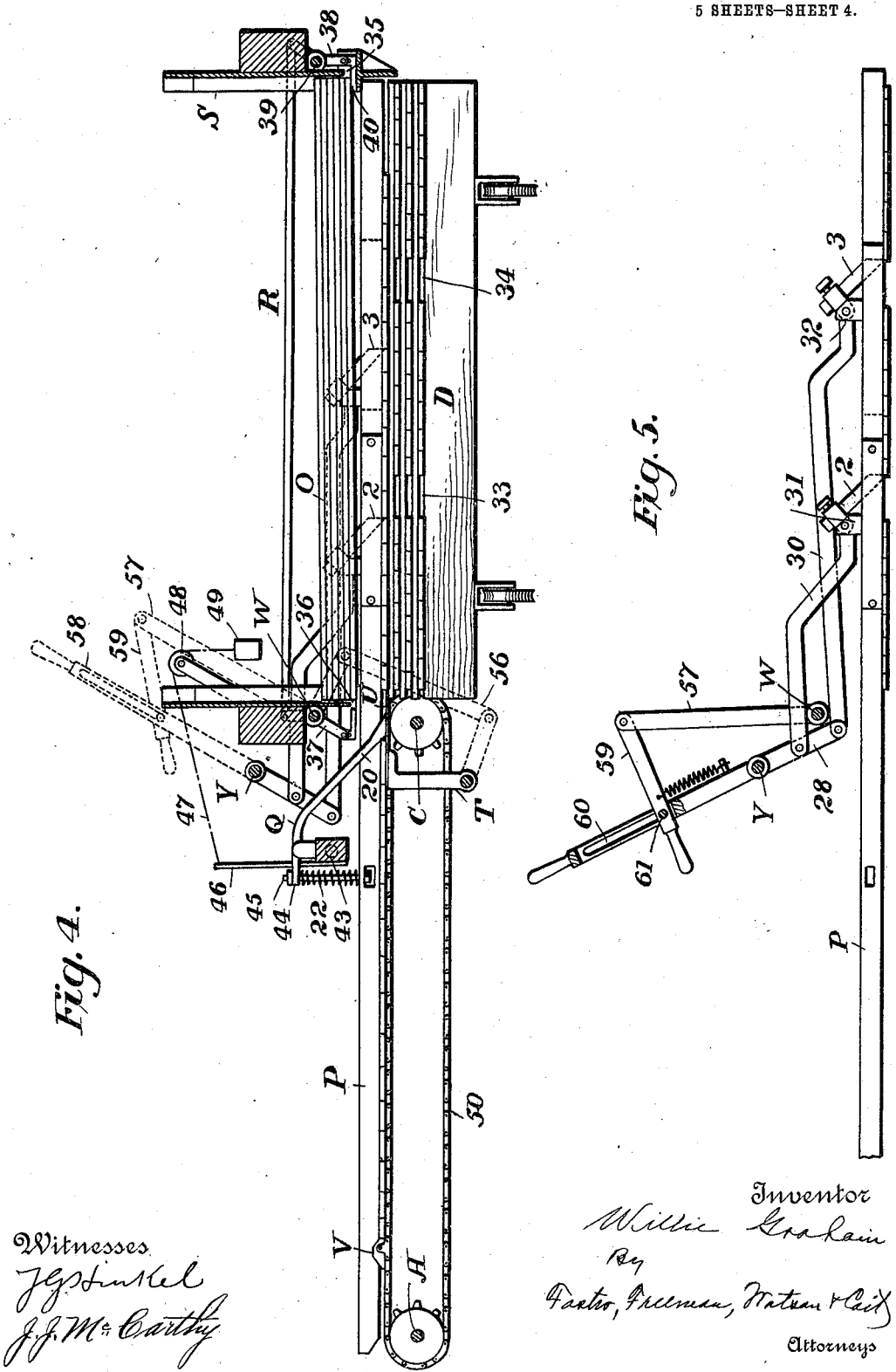

W. GRAHAM.
LUMBER STACKING DEVICE.
APPLICATION FILED MAY 3, 1909.
983,891.
Patented Feb. 14, 1911.
5 SHEETS—SHEET 5.
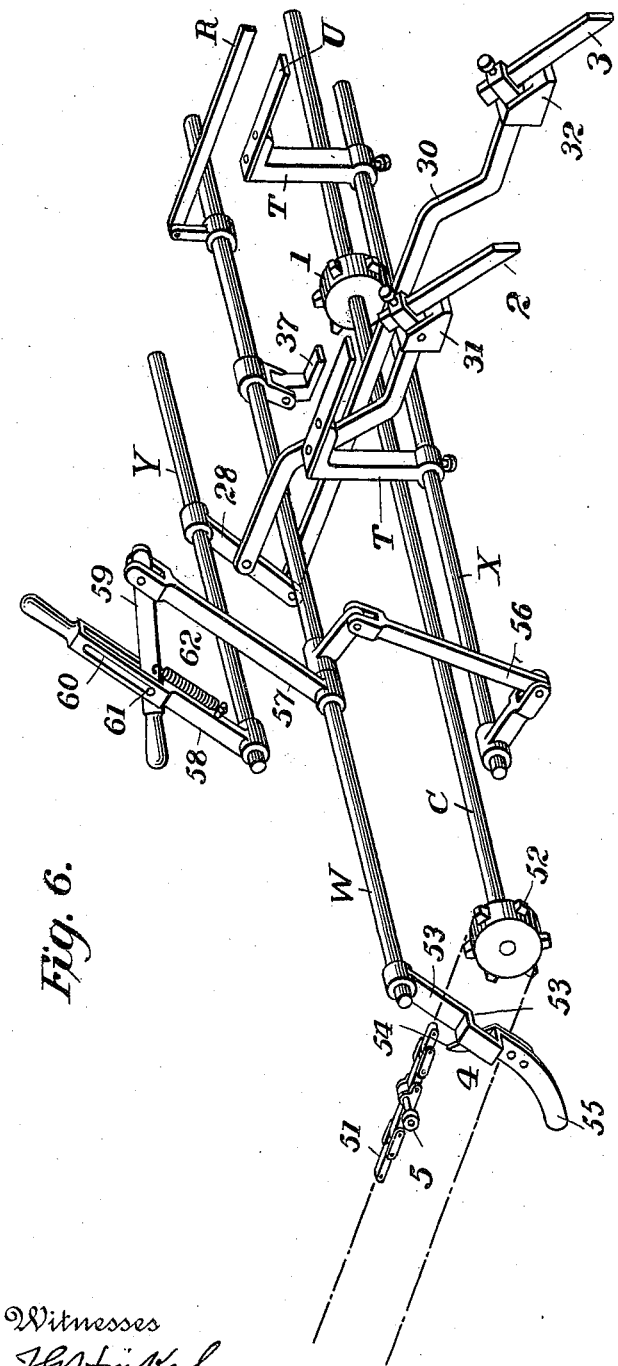
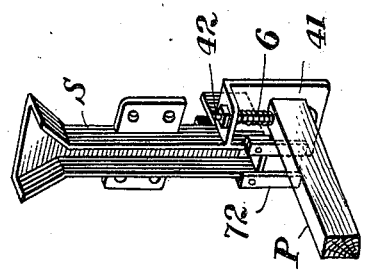

ived in the drawings I have diagrammatically shown
UNITED STATES PATENT OFFICE.

WILLIE GRAHAM, OF NEW ORLEANS, LOUISIANA, ASSIGNOR TO ORLEANS DRY KILN & STACKER CO., A CORPORATION OF LOUISIANA.

LUMBER-STACKING DEVICE.

983,891.     Specification of Letters Patent.     Patented Feb. 14, 1911.

Application filed May 3, 1909. Serial No. 493,683.

*To all whom it may concern:*

Be it known that I, WILLIE GRAHAM, a citizen of the United States, and resident of New Orleans, in the parish of Orleans and State of Louisiana, have invented certain new and useful Improvements in Lumber-Stacking Devices, of which the following is a specification.

This invention relates to lumber stackers and is designed particularly to pile lumber on cars or kiln trucks preparatory to drying it.

My device as a whole is intended to pile the lumber on the truck in flat layers or tiers, one above the other, with separating sticks regularly and properly placed between the layers and with vertical spaces left for the circulation of the air at intervals up through the lumber. It includes the vertically movable platform or pallet constituting a part of the track on which the cars or kiln trucks run, and means for raising and lowering the platform so that the car on it will be in proper position to receive the successive layers of lumber and separating sticks from the supply or feeding mechanism mounted in a fixed position considerably above the track. In the particular apparatus shown the lumber is accumulated by the feeding mechanism in layers wide enough to cover the car which it is intended to load, and the entire layer is pushed by the feeding mechanism at once on to the car, the separating sticks are placed on it, and the layer is divided to form vertical passages for the air. In the preferred form, these operations are automatic, and the movable platform is automatically lowered each time to receive the next successive layer of lumber. In my device the lumber is fed in in flat horizontal layers as distinguished from those stackers which place the lumber on edge.

In addition to the novel arrangement of the main parts of the apparatus, my invention includes many novel features which will be apparent from the following description taken in connection with the accompanying drawings.

The advantages of those features will furthermore be understood by those skilled in the art from the following description.

In the accompanying drawings,—Figure 1 is a plan view showing more or less diagrammatically the arrangement of the parts of my apparatus; Fig. 2 is a side elevation; Fig. 3 is a section on the line 3—3 of Fig. 2, showing parts in elevation; Fig. 4 is an enlarged detail view showing means for accumulating the lumber and feeding it on to the car; Fig. 5 is a detail view of the mechanism for spacing the layers on the car so as to leave vertical passages; Fig. 6 is a perspective view of the operating shafts and their connections for the means for feeding and spacing the lumber and for feeding the separating sticks; Fig. 7 is an enlarged detail perspective view of one of the hoppers for containing the separating sticks; and Fig. 8 is an enlarged detail view of the adjustable arm for operating the elevating mechanism.

It will be understood by those skilled in the art that the lumber which is to be piled on the cars preparatory to drying it is brought to the stacker from the mill or other source of supply by endless chains or conveyers, and therefore in the present case I have not thought it necessary to show the details of such conveying means. In the drawings I have diagrammatically shown the ends of these conveying chains marked 7, and it will be observed that they pass over sprocket wheels 8 on the shaft B. It will be further observed that these chains bring the lumber up above a stationary platform 9 supported by posts 10 considerably above the ground. As hereafter described, this platform contains means for accumulating and supplying the lumber in layers to the car. At the end of the above described platform there is an open-sided well or chamber having at its corners the upright supporting posts 11, 12, and within this chamber the platform or pallet E is adapted to be raised and lowered. This movable platform has car tracks I which are in such position that when the platform is in its lowered position they will be in line with the tracks 13 which are on or above the ground and lead to the kiln or other place desired. It will be apparent therefore that when the platform is in its lowered position the kiln cars D may be rolled on it from the track and when elevated the kiln cars move with it. The means for elevating the platform preferably consists in wire ropes 14 connected to the corners of the platform by eye-bolts 15 and passing over sheaves N at the top carried by the main frame of the platform. These ropes at one end of the apparatus pass down directly to the winding drums F, while the ropes at the other end pass under sheave 16 and then to the winding drums F. The shaft 17 on which the drums F are mounted is driven by a gear 18 from a worm on the shaft 19, the said gear 18 being inclosed in the casing G. It will be understood that when it is desired to commence loading the cars D they are elevated with the platform E until they are on a level with the platform 9 and in position to receive the lumber fed in from platform 9.

The lumber which is brought to the stacker by the chains 7 is not placed thereon with much regularity, and therefore before pushing it onto the car it is necessary to accumulate and bring into proper position such a number of boards as will cover the car in the manner desired. In order to effect this accumulation I have provided mechanism for stopping the lumber which is being brought in by the chains 7 and have also provided a supplemental conveyer made up of the endless chains 21 passing around sprocket wheels on the shafts A, C, and it will be understood that this supplemental conveyer is capable of being controlled independently of the main conveying chains 7. The lumber is accumulated on this supplemental conveyer with the boards close against each other, and the boards so accumulated are prevented from passing off of the conveyer by the arm 20 which operates as a stop. The lumber so accumulated is at the proper time forced beneath the ends of the arms 20 by lugs V of peculiar form hereinafter described carried by the endless chains 21 of the supplemental conveyer. In order to prevent buckling of this layer of lumber while it is being forced into position on the car I use presser bars P which extend entirely over the supplemental conveyer as well as over the car which is being loaded, and it will be understood that there will be any suitable number of these presser bars. They are forced downwardly onto the lumber by means of springs, one of these springs being shown in Fig. 4 marked 22, and the other being shown at the other end of the bar marked 6 in Fig. 7.

As above stated it is necessary to stop the lumber being fed by the conveyer 7, and to effect this I prefer to use the peculiar form of mechanism shown in Fig. 2 embodying the rocking arms K which operate as a secondary accumulator. These arms are pivoted between their ends at 23 and at their ends carry the upwardly extending metal points 24, 25, which have vertical sides facing outwardly away from the machine. The arm K is rocked on its pivot by a link arm 26 connected to the rock shaft 27 and this rock shaft is provided with any suitable handles or operating means extending to a position convenient for the person running the machine. It will be observed that by rocking the arm K the points 24 and 25 are alternately brought into position in front of the lumber being brought in by the chains 7, and that therefore they alternately stop that lumber. The operator will naturally first raise the point 25, and when he has accumulated the amount of lumber desired he will rock the arm so as to elevate the point 24 and allow this accumulated lumber to pass onto the supplemental conveying chains 21. The distance between the points 24 and 25 is made just great enough to allow for the accumulation of a layer of lumber of the proper width for the car. When the lumber has been forced onto the car by the lugs V of the supplemental conveyer it will be in one continuous layer lying on the separator sticks which are at right angles thereto, and it is desirable to divide this layer so as to allow vertical air passages through the lumber. In order to accomplish this division I use the separating means shown in detail in Figs. 5 and 6. This means includes a rock shaft Y having thereon the arms 28 to which are secured the link arms 29 and 30. These link arms are mounted to slide at their outer ends 31, 32 on the presser bars P, and they carry at their ends the sharp pointed forwardly inclined points 2 and 3 which are adapted to engage the upper surface of the lumber, as indicated in Fig. 5. It will be observed that the leverage for the link arm 30 is twice as great as that for the arm 29, and that therefore, while the point 2 moves the lumber in advance of it a sufficient distance to form the opening 33, the point 3 moves a sufficient distance to leave the second opening 34 of the same size. It will of course be understood that any number of these separators which are desired may be used.

When a layer of lumber is in place on the car it is necessary to place on it transverse separating sticks so as to permit the passage of air between it and the next layer, and in order to get the best results and to prevent warping of the lumber it is necessary that these separating sticks be placed in position with accuracy, one directly above the other. These separating sticks when they have passed through the kiln once or twice are likely to become somewhat warped or twisted, and therefore it has been difficult to secure mechanical means for properly feeding and positioning these sticks. In my apparatus these sticks are held in proper position without regard to any curvature therein and are placed accurately one above the other without any binding in the mechanism which feeds them. As indicated in Figs. 3 and 4 of the drawings, I use a series of vertical open-sided hoppers S on each side of the space above the car, these hoppers being arranged in pairs and the distance between them being the length of the separating sticks. One end of the separating stick fits in the hopper on one side and the opposite end in the hopper on the other side, and as hereafter explained, it is merely necessary for a boy to keep these hoppers supplied with sticks in order to insure that they will be properly placed on the lumber. It will be seen by reference to Fig. 7 that these hoppers have a rear wall and side walls flaring at the top, and a bottom wall, but no front wall. Just above the bottom wall the rear wall of the hoppers on the side opposite the wall of the feeding mechanism are provided with openings 35 somewhat wider than the thickness of the separating stick. The hoppers on the side next to the feeding mechanism are provided with openings 36 in the rear wall at the bottom which are not so wide as the thickness of the separating sticks. The separating sticks are normally supported by the bottom walls of the hoppers and they are discharged from those hoppers at the proper time by feeding mechanism, which includes the rocking arms 37, 38 mounted on the shafts W and 39. These two rock shafts are connected by the link arm R so that they will move together. The arm 37 has the pivoted toe or plunger 1 which enters the opening 36 in the hopper, thus striking the end of the bottom separating stick and pushing it off the bottom of the hopper so that it will be allowed to fall. In this operation the opposite end of the stick will necessarily pass through the enlarged opening 35 in the opposite hopper. When the arms 37 and 38 are rocked in the opposite direction the toes or plungers 40 on the arm 38 engage the end of the separating stick which has been partially released and forces it out of the hopper so that the stick falls into position flat upon the layer of lumber. It will be understood that this operation takes place in the entire series of hoppers at one time, all of them being constructed alike and each having toes or plungers for forcing out the sticks.

Since the side walls and bottoms of the hoppers S are narrow it will be observed that the separating sticks O are held only at their ends, and that therefore even if some of those sticks should happen to be bent or warped they will be held accurately in a proper position. There will furthermore be no binding which would interfere with the operation of dropping the sticks into place, and therefore the operation of feeding these sticks will proceed without interference whether or not they are all straight.

In order to permit the layer of lumber pressed down by the presser bars P to pass over the ends of the separating sticks lying on the preceding layer of lumber I provide the movable plates or shields U which are carried by the arms T mounted on the rock shaft X. These shields are preferably made in the form of thin steel plates, and one of them is adapted to rest upon the exposed end of each of the separating sticks. The layer of lumber thus slides on these plates passing over the separating sticks without striking their ends. The shaft X is rocked at proper intervals as hereafter described in order to move the plates U out of the way when a new set of spacing sticks is being dropped onto the car. It will be observed by reference to Fig. 7 that the spacing sticks are supplied immediately by the side of the presser bar P. The inner end of this presser bar works against a bracket on the lower side of the hopper S, this bracket being provided with a vertical flange 41 which extends somewhat below the normal position of the presser bar. A pin 42 passes through the end of the presser bar and is surrounded by the spring 6. The flange 41 serves as an abutment against which the presser bar bears, and thus prevents the presser bar from being pushed out of position by the friction of the lumber being pushed into place, and this flange also serves as a stop for the lumber itself and for the separating sticks at the rear side of the car. The arm 20 which operates as a stop for the lumber just before it enters the car is rigidly secured at its upper end to a beam 43 which is pivoted at its ends so that it may rock. This beam also has an ear 44 which surrounds the bolt 45 secured to the presser bar P, and it will be understood that this ear may be made integral with the arm 20 if desired, as shown in Fig. 1. An upright arm 46 is also secured to the beam 43 and a cord 47 is secured to this arm and passes over the pulley 48 carrying on its lower end the weight 49 which tends to hold the beam in the position shown in Fig. 4. By the above construction it will be observed that when lumber is forced beneath the end of the arm 20 the beam 43 will be rocked on its pivot, the spring 22 of the presser bar will be further compressed, and the weight 49 will be lifted. This additional pressure on the pressure bar at the time that the blocks or lugs V commence to move the layer of lumber is of advantage, since it prevents the buckling of the lumber. The lugs V are made of the peculiar shape shown in Fig. 4 in order to push the lumber out of the way of the protecting plates U, these lugs or blocks being in practice made about seven inches long and four and one-half inches high, and they are provided with an incline on the front face as well as on the rear face. These inclines as the block passes around the sprocket wheels on shaft C by a wiping action force the layer of lumber beyond the ends of the plates U so that those plates may be raised out of the way.

In order to secure the automatic action of the separating mechanism and the means for feeding the separating sticks the various operating shafts are suitably connected together and they are operated by a chain 50 which is outside of the path of the lumber and to one side of the path of the frame, as will be seen by reference to Fig. 1. This chain has at one point a roller 5 which when it reaches the end next to the car will strike the arm 4 secured to the shaft W. As the roller passes forward around the sprocket wheel 52 on the shaft C it will carry forward the arm 4, thus rocking the shaft W. It will be observed however that near its center the arm 4 has a side bend or notch 53 large enough to permit the roller 51 to pass through it, and there is a guide plate 54 for directing the roller into that groove. After the roller has passed through this groove it will commence its return movement and will then engage the outer curved end of the arm 4 and will draw it in its reverse direction until the roller passes off of the lower end 55. Its action therefore results in an oscillation of the shaft W. The shaft W is connected by link arm 56 to the shaft X so that its oscillation is imparted to that shaft, and this results in raising the protecting plates U out of the way, as above described. The shaft W is also connected to the shaft Y by the arms 57, 58 and the link arm 59 and by this means the separating points 2 and 3 are moved to separate the lumber just as the shaft W operates the toes to deposit another set of separating sticks. It may sometimes happen that the layer of lumber is wider than desired or that the separating points 2 and 3 may strike an obstruction which prevents their movement forward for the accustomed distance. Since however the shaft W must necessarily be turned the same amount each time by the roller 5 and arm 4 it is found advisable to have a somewhat flexible connection between that shaft and the shaft Y. In Fig. 6 I have shown the arm 58 provided with a longitudinal slot 60 in which slides the pin 61 on the arm 59, and this arm 59 is held normally in position by spring 62. If one of the points 2 and 3 strikes an obstruction and cannot move forward the pin 61 will slide up the slot 60, expanding the spring 62.

On the opposite side of the chain 50 from the roller 5 there is another roller 63 which is adapted to engage an arm 64 secured to turn with the short shaft 65. Secured to the shaft 65 there is also an arm 66 having the link connection 67 for throwing into or out of operation the means for elevating and lowering the car E. The engagement of the roller 63 with the arm 64 turns the shaft 65 and during the time that the arm 64 is elevated the car E is being lowered. It will be understood that the arm 64 returns to its normal or lowered position by gravity or by the action of a spring as soon as the roller passes beyond the end thereof, and that the downward movement of the car E stops at that time. In order to regulate the extent to which the car E descends I provide means for regulating the length of the arm 64 and consequently the time during which it will be elevated by the roller. In order to accomplish this the arm 64 slides longitudinally in a bearing formed in the block 68 secured to the shaft 65, and the longitudinal position of the arm is controlled by a screw 69 engaging the block 68 at one end and having screw thread connection with the flange 70 of the arm. By thus regulating the length of the arm 64 the car E may descend just the amount necessary in order to receive lumber of the particular thickness being handled by the operator at the time. In order that this mechanism may be operated by hand a suitable hand lever 71 is provided and it will be understood that it will be placed in a position convenient to the operator and will be suitably connected to the shaft 65. It will be further understood that the parts are so arranged and so timed that the car will be lowered after the layer of lumber has been placed in position and after the separating sticks have been dropped on it. The question as to which particular shaft of the machine operates the various sets of mechanism is of course immaterial so long as those parts are so connected as to effect the various operations above indicated, and so as to time those operations so that they will occur in proper succession.

In order to make sure that the separating sticks fall into proper position after leaving the hoppers it may be desirable to use the flat springs 72 shown in Fig. 7, which serve as guides to direct the sticks and at the same time are so flexible that they will yield and bend out of position when the lumber is forced into place.

As shown in Fig. 2 I have provided a platform L extending along the side above the chamber in which the car moves and partly over the accumulating mechanism, and it will be understood that the operator stands on this platform and has convenient for his control the various levers for operating the mechanism. By the side of this platform there is a lower platform M upon which the separating sticks are ordinarily kept in convenient position to be dropped into the hoppers.

The power for operating the entire machine is applied to the pulley 73 on the shaft 74, and this shaft has on it two oppositely facing bevel friction gears 75, 76, which are preferably made of paper. They are adapted to be brought into engagement with the metal bevel friction disk 77 on shaft 78, and it will be understood that the shaft 78 will be driven in one direction or in the other in accordance with which one of the friction disks 75, 76 is in engagement with it. Any suitable means may be employed for shifting the parts so as to bring one or the other of these gears into engagement, and this may be by an oscillation of the shaft 78 itself. The shaft 78 has a bevel toothed gear 79 which engages the corresponding gear 80 on the shaft 19 which carries the worm engaging the gear 18 connected to the winding drums. By turning the shaft 78 therefore in one direction or the other the elevating chains are wound or unwound on the drums F. The shaft 74 has on its end the pinion 81 which engages the larger pinions 82, 83 on shafts 84, 85. The shaft 85 by chain and sprocket connection 86 drives the shaft B, which carries the main conveying chains 7, and the shaft 84, by the chain and sprocket connection 87, drives the shaft C, which carries the supplemental conveying chains 21. The hand lever 88 by link connection 89 controls the operation of the shaft 85, and the hand lever 90 through the link connection 91 controls the operation of the shaft 84. The shaft 85 driving the main chains 7 is normally allowed to run continuously while the shaft 84 is stopped intermittently as the lumber is accumulated and driven onto the car. The link connections 89, 91 for throwing the gears 82 and 83 into and out of operation may be of any suitable and well known kind.

It will be observed that the hoppers or guide ways S for the separating sticks are above and at opposite sides of the lumber stacking platform and that they extend down to a point immediately above that occupied by the top layer of lumber so that the sticks have only a short distance to fall when they are discharged from the hoppers and consequently will not be displaced. Their motion in being discharged is longitudinal and is for such a short distance that there is practically no tendency to displace them laterally. It has been found practically impossible to push the sticks longitudinally from one side clear across the stack without displacing them and it was to overcome such difficulties that my stick feeding mechanism was devised.

The spacing arms 30 preferably slide at their outer ends 31, 32 on the tops of the presser bars and the points 2 and 3 pass down through slots 92 formed on those bars. The slots may be formed as shown in Fig. 2 by separate pieces 93 secured to the sides of the presser bars.

The stationary lumber support 9 is of course preferably made level and since the lumber stacking platform E can be brought, and in the specific form shown is automatically brought, to such position that the top of the lumber with the separating sticks thereon is at the same height as the lumber support it will be clear that the layer is forced in flat condition and in a straight line onto the stack of lumber. It will be observed that the distance which the arm 53 is placed from the sprocket wheel 52 at the end of the supplementary conveyer will control the timing of the forward and backward movement of that arm and consequently the motion of the shields, the spacing mechanism and the stick feeding mechanism. The relative position on chain 51 of the roller 5 coöperating with arm 53 and roller 63 coöperating with arm 64 determines the timing of the platform lowering mechanism with reference to the operation of placing the lumber on the stack.

While I have referred to the conveyer and the part 51 as chains, it will be understood to include any suitable endless belt and the term rollers applied to the parts 5 and 63 will be understood as including any suitable projections. It will of course be further understood that my invention is not limited to the use of wire ropes for elevating the platform since any other suitable elevating means may be used. The tracks 13 are usually elevated several feet from the ground and usually lead to kilns for drying the lumber, but my invention is not limited in this respect since the cars or trucks on which the lumber has been piled may be carried to any place desired.

Having thus described the invention, what is claimed is:

1. In a machine for stacking lumber, the combination with an elevated lumber support or platform, of a vertically movable platform by the side of said support, lumber trucks or cars on said movable platform, and means for forcing lumber from said support to said cars so as to cover said cars or trucks in layers.

2. In a machine for stacking lumber, the combination with a lumber support, of a platform immediately by the side of but below said support, lumber trucks or cars on said platform, and means for raising and lowering said platform so as to maintain the top of the lumber on said trucks level with said support.

3. In a machine for stacking lumber, the combination with a lumber support, of a platform immediately by the side of but below said support, lumber trucks or cars on said platform, means for raising and lowering said platform so as to maintain the top of the lumber on said trucks level with said support, and means for feeding lumber from said support to said trucks in flat horizontal layers.

4. In a machine for stacking lumber, the combination with a lumber support, of a platform immediately by the side of but below said support, means for raising and lowering said platform at will and maintaining it at any desired elevation, and means on said support for accumulating and feeding lumber.

5. In a machine for stacking lumber, the combination with a lumber support, of a platform immediately by the side of but below said support, lumber trucks or cars on said platform, means for raising and lowering said platform so as to maintain the top of the lumber on said trucks level with said support, means for feeding lumber from said support to said trucks in flat horizontal layers, and means above said platform for dropping spacing sticks in proper position on said layers of lumber.

6. In a machine for stacking lumber, the combination with a support, of means thereon for accumulating a layer of lumber edge to edge of the width desired in the stack, and means for forcing the entire layer at once onto the stack.

7. In a machine for stacking lumber, the combination with a support, of means thereon for accumulating a layer of lumber edge to edge of the width desired in the stack, means for forcing the entire layer at once onto the stack, and means for preventing the buckling of the layer during the operation.

8. In a machine for stacking lumber, the combination with a support, of means thereon for accumulating a layer of lumber edge to edge of the width desired in the stack, means for forcing the entire layer at once onto the stack, and presser bars bearing on the top of said layer to prevent buckling.

9. In a machine for stacking lumber, the combination with a support, of means thereon for accumulating a layer of lumber edge to edge of the width desired in the stack, means for forcing the entire layer at once onto the stack, and presser bars bearing on the top of said layer to prevent buckling and extending over the stack.

10. In a machine for stacking lumber, the combination with a support, of means thereon for accumulating a layer of lumber edge to edge of the width desired in the stack, means for forcing the entire layer at once onto the stack, presser bars bearing on the top of said layer to prevent buckling, and means for increasing the pressure on said presser bars after the layer has been accumulated beneath them and during the operation of forcing the layer onto the stack.

11. In a machine for stacking lumber, the combination with a support, of means thereon for accumulating a layer of lumber edge to edge of the width desired in the stack, means for forcing the entire layer at once onto the stack, and means for separating the layer on the stack to form vertical air passages.

12. In a machine for stacking lumber, the combination with a support, of means thereon for accumulating a layer of lumber edge to edge of the width desired in the stack, means for forcing the entire layer at once onto the stack, means for separating the layer on the stack to form vertical air passages, and means for depositing spacing sticks at regular intervals on said layer.

13. In a machine for stacking lumber, the combination with a support, of means thereon for accumulating a layer of lumber edge to edge of the width desired in the stack, means for forcing the entire layer at once onto the stack, automatic means for separating the layer to form air passages, and automatic means for depositing spacing sticks at regular intervals on said layer.

14. In a machine for stacking lumber, the combination with a support, of means thereon for accumulating a layer of lumber edge to edge of the width desired in the stack, means for forcing the entire layer at once onto the stack, and means for maintaining said support and the top of said stack at the same height whereby the lumber will pass directly onto said stack.

15. In a machine for stacking lumber, the combination with a fixed support, of means thereon for accumulating a layer of lumber edge to edge of the width desired in the stack, a vertically movable platform for the lumber stack by the side of said fixed support, means for forcing said accumulated layer edgewise onto said stack, and means for maintaining the top of said stack at the same height as the support.

16. In a machine for stacking lumber, the combination with a fixed support, of means thereon for accumulating a layer of lumber edge to edge of the width desired in the stack, a vertically movable platform for the lumber stack by the side of said fixed support, means for forcing said accumulated layer edgewise onto said stack, means for maintaining the top of said stack at the same height as the support, and presser bars extending over said support and stack and adapted to bear on said layer to hold it in place.

17. In a lumber stacking apparatus, the combination with a lumber truck or car, of means for forcing layers of lumber flatwise onto said car, means for depositing spacing sticks in fixed positions on said layers, and movable shields adapted to overlie the ends of said sticks and guide the layer of lumber into position on said sticks.

18. In a lumber stacking apparatus, the combination with a lumber truck or car, of means for forcing layers of lumber flatwise onto said car, means for depositing spacing sticks in fixed positions on said layers, movable shields adapted to overlie the ends of said sticks and guide the layer of lumber into position on said sticks, and means for moving said shields out of the way as a succeeding layer of sticks is deposited.

19. In a lumber stacking apparatus, the combination with a lumber truck or car, of means for forcing layers of lumber flatwise onto said car, means for depositing spacing sticks in fixed positions on said layers, movable shields adapted to overlie the ends of said sticks and guide the layer of lumber into position on said sticks, and means for forcing said layer beyond the ends of said shields.

20. In a lumber stacking apparatus, the combination with a lumber truck or car, of means for forcing layers of lumber flatwise onto said car, means for depositing spacing sticks in fixed positions on said layers, movable shields adapted to overlie the ends of said sticks and guide the layer of lumber into position on said sticks, means for forcing said layer beyond the ends of said shield, and means for raising said shields out of the way as a succeeding set of sticks is deposited.

21. In a lumber stacking apparatus, the combination with a lumber truck or car, of means for forcing layers of lumber flatwise onto said car, means for automatically depositing spacing sticks in fixed positions on said layers, pivoted shields adapted to overlie the ends of said sticks and guide the layer of lumber into position on said sticks, and means for automatically turning said shields on their pivots out of the way as a succeeding set of sticks is deposited.

22. In a lumber stacking apparatus, the combination with a lumber truck or car, of means for forcing layers of lumber flatwise onto said car, means for depositing spacing sticks in fixed positions on said layers, presser bars above said car adapted to bear downward on said layers of lumber, and stops to prevent longitudinal movement of said presser bars and sticks by friction against the moving layer of lumber.

23. In a lumber stacking apparatus, separating means comprising points adapted to engage a flat layer of lumber, means for driving said points across said stacking apparatus to separate said lumber, a fixed distance and yielding connection between said points and driving means whereby the lumber may stop without breaking the driving means if it strikes an obstruction.

24. In a lumber stacking apparatus, separating means comprising sets of points adapted to engage a flat layer of lumber on successive lines longitudinally thereof, a shaft having arms for driving said points across said layer, and means for connecting said points to said arms the successive sets of points being connected to said arms at successively greater distances from said shaft whereby the amplitude of movement of the sets will be progressive.

25. In a lumber stacking apparatus, the combination with an oscillating driving shaft, of means for positively turning it a fixed distance, a second shaft, separating mechanism connected to said second shaft so as to be operated thereby, and connections between said shafts so constructed as to make them normally turn together but adapted to yield when the separating mechanism strikes an obstruction.

26. In a lumber stacking apparatus, the combination with an oscillating driving shaft, of a second shaft parallel therewith, parallel fixed arms on said shafts, a link pivotally connecting said arms, the connection between said link and one of said arms being such as to permit said link to slide outwardly from normal position along said arm, and a spring tending to hold said link in normal position.

27. In a lumber stacking apparatus, the combination with presser bars adapted to extend across a stack of lumber, of separating means carried by and adapted to slide on said presser bars.

28. In a lumber stacking apparatus, the combination with presser bars adapted to extend across a stack of lumber, of separating points adapted to engage the lumber when moving in one direction and mounted to slide longitudinally of said presser bars, and means for reciprocating said points.

29. In a lumber stacking apparatus, the combination with presser bars adapted to extend across a stack of lumber, of separating points adapted to engage the lumber when moving in one direction, longitudinal guides for said points on said presser bars, and means for reciprocating said points in said guides.

30. In a lumber stacking apparatus, the combination with a support for a stack of lumber, of open-sided hoppers on opposite sides of said supports adapted to engage and guide the ends of spacing sticks, and means for discharging said sticks one at a time from the ends of said hoppers.

31. In a lumber stacking apparatus, the combination with a support for a stack of lumber, of open-sided hoppers on opposite sides of said supports adapted to engage and guide the ends of spacing sticks, means at the lower ends of said hoppers for supporting the ends of said sticks, and means for discharging said sticks one at a time.

32. In a lumber stacking apparatus, the combination with a support for a stack of lumber, of open-sided hoppers on opposite sides of said supports adapted to engage and guide the ends of spacing sticks, means at the lower ends of said hoppers for supporting the ends of said sticks, and means for moving the bottom stick longitudinally off of said end supports.

33. In a lumber stacking apparatus, the combination with a support for a stack of lumber, of open-sided hoppers on opposite sides of said supports adapted to engage and guide the ends of spacing sticks, means at the lower ends of said hoppers for supporting the ends of said sticks, and means for oscillating the bottom stick longitudinally so as to successively release it from said end supports.

34. In a lumber stacking apparatus, the combination with a support for a stack of lumber, of open-sided hoppers on opposite sides of said supports adapted to engage and guide the ends of spacing sticks, means for maintaining said support and hoppers in such position that the lower ends of said hoppers will be immediately above the sides of the stack of lumber on said support, and means for discharging said sticks one at a time from the lower ends of said hoppers.

35. In a device of the class described, the combination with narrow hoppers open on the sides facing each other, and adapted to receive the ends of a pile of spacing sticks, narrow supports at the lower ends of said hoppers adapted to support said pile of sticks, and means for oscillating the bottom stick longitudinally to release it from said supports and to allow it to fall.

36. In a device of the class described, the combination with narrow hoppers open on the sides facing each other and adapted to receive the ends of a pile of spacing sticks, narrow supports at the lower ends of said hoppers adapted to support said pile of sticks, means for oscillating the bottom stick longitudinally to release it from said supports and to allow it to fall, and yielding guides by the sides of said hoppers and extending below the same to direct said sticks after being released.

37. In a device of the class described, the combination with narrow hoppers open on the sides facing each other and adapted to receive the ends of a pile of spacing sticks, narrow supports at the lower ends of said hoppers adapted to support said pile of sticks, plungers adapted to pass through the rear walls of said hoppers immediately above the said supports and to engage the ends of the bottom stick.

38. In a device of the class described, the combination with narrow hoppers open on the sides facing each other and adapted to receive the ends of a pile of spacing sticks, narrow supports at the lower ends of said hoppers adapted to support said pile of sticks, plungers connected together and adapted to pass through the rear walls of opposite hoppers alternately immediately above said supports and to engage the ends of the bottom stick in order to release said ends from said supports.

39. In a device of the class described, the combination with narrow hoppers open on the sides facing each other and adapted to receive the ends of a pile of spacing sticks, narrow supports at the lower ends of said hoppers adapted to support said pile of sticks, the rear wall of one hopper being provided with an opening immediately above said support larger than the end of one of said spacing sticks and the rear wall of the opposite hopper being provided with a similar opening of less size than the end of said stick, and plungers adapted to enter said openings to move said sticks longitudinally off of said supports.

40. In a device of the class described, the combination with a lumber conveyer, of accumulating mechanism comprising stops separated longitudinally of said conveyer, and means for projecting said stops alternately in the path of the lumber on said conveyer.

41. In a device of the class described, the combination with a lumber conveyer, of accumulating mechanism comprising stops separated longitudinally of said conveyer, means connecting said stops pivotally supported between its ends, and means for oscillating said supporting means on its pivot to alternately project said stops into the path of the lumber on said conveyer.

42. In a device of the class described, the combination with a lumber conveyer, of accumulating mechanism comprising arms pivoted between their ends below said conveyer and extending longitudinally thereof, stops carried by the ends of said arms, and means for oscillating said arms on their pivots to project said stops alternately in the path of the lumber on said conveyer.

43. In a device of the class described, a conveyer adapted to receive and accumulate lumber and to force it in a layer onto a stack or pile comprising endless chains adapted to engage and move said lumber by friction, a flexible stop for the lumber at the forward end of said conveyer, and lugs on said chains adapted to positively engage the rear edge of said layer and force it past said stop.

44. In a device of the class described, a conveyer adapted to receive and accumulate lumber and to force it in a layer onto a stack or pile comprising endless chains adapted to engage and move said lumber by friction, a flexible stop for the lumber at the forward end of said conveyer, lugs on said chains adapted to positively engage the rear edge of said layer and force it past said stop, and means for preventing buckling of said layer when being moved by said lugs.

45. In a device of the class described, a conveyer adapted to receive and accumulate lumber and to force it in a layer onto a stack or pile comprising endless chains adapted to engage and move said lumber by friction, a flexible stop for the lumber at the forward end of said conveyer, lugs on said chains adapted to positively engage the rear edge of said layer and force it past said stop, and presser bars above said conveyer adapted to prevent buckling of said layer when being moved by said lugs.

46. In a device of the class described, a conveyer adapted to receive and accumulate lumber and to force it in a layer onto a stack or pile comprising endless chains adapted to engage and move said lumber by friction, a flexible stop for the lumber at the forward end of said conveyer, lugs on said chains adapted to positively engage the rear edge of said layer and force it past said stop, presser bars above said conveyer adapted to prevent buckling of said layer when being moved by said lugs, and means operated by said flexible stop for increasing the pressure on said bars as the layer is forced past the stop.

47. In a device of the class described, a conveyer adapted to receive and accumulate lumber and to force it in a layer onto a stack or pile comprising endless chains adapted to engage and move said lumber by friction, a pivoted arm having one end projecting normally in the path of said lumber at the forward end of said conveyer to act as a stop, presser bars above said conveyer adapted to prevent buckling of said layer, and springs between said arms and bars adapted to be brought under tension by the movement of said arms in permitting the lumber to pass.

48. In a device of the class described, a conveyer adapted to receive and accumulate lumber and to force it in a layer onto a stack or pile comprising sprocket wheels, endless chains on said wheels adapted to move said lumber by friction, and lugs on said chains adapted to positively engage the rear edge of said layer to force it forward, the tops of said lugs being so formed as to force the lumber beyond the end of the conveyer as they go down around the sprocket wheels.

49. In a device of the class described, a conveyer adapted to receive and accumulate lumber and to force it in a layer onto a stack or pile comprising sprocket wheels, endless chains on said wheels adapted to move said lumber by friction, lugs on said chains adapted to positively engage the rear edge of said layer to force it forward, and shields extending beyond the end of said conveyer and adapted to support the lumber, the tops of said lugs being so formed as to force the lumber beyond the end of said shields as they go down around the sprocket wheels.

50. In a device of the class described, the combination of an endless conveyer, of lugs thereon adapted to engage and positively move a layer of lumber, the said lugs having inclined upper surfaces adapted to force said layer beyond the end of said conveyer by a wiping action.

51. In a device of the class described, the combination with an endless conveyer, of drive shafts therefor, mechanism for stacking the lumber carried by said conveyer, an endless chain carried by the said drive shafts, a projection or roller on said chain, an oscillating shaft for operating said stacking mechanism, and an arm on said oscillating shaft in the path of said roller whereby it will be oscillated by said roller.

52. In a device of the class described, the combination with an endless conveyer, of drive shafts therefor, mechanism for stacking the lumber carried by said conveyer, an endless chain carried by the said drive shafts, a projection or roller on said chain, an oscillating shaft for operating said stacking mechanism, and an arm on said oscillating shaft in the path of said roller so shaped as to permit the roller to pass after it has been turned a certain distance and as to engage said roller on its return movement.

53. In a device of the class described, the combination with an endless conveyer, of drive shafts therefor, mechanism for stacking the lumber carried by said conveyer, an endless chain carried by the said drive shafts, a projection or roller on said chain, an oscillating shaft for operating said stacking mechanism, and an arm on said oscillating shaft in the path of said roller having a notch in its side to permit the passage of said roller after it has moved a certain distance and to engage said roller on its return movement.

54. In a device of the class described, the combination with an oscillating drive shaft, of an endless chain, means for driving said chain, a projection or roller on said chain, and an arm on said drive shaft in the path of said roller so shaped as to permit the roller to pass after it has been turned a certain distance and to engage said roller on its return movement.

55. In a device of the class described, the combination with a support for lumber, of a vertically movable platform by the side of said support, means for stacking lumber on said platform in layers, mechanism for raising and lowering said platform, and means controlled by the stacking mechanism for throwing said raising and lowering means into and out of operation.

56. In a device of the class described, the combination with a support for lumber, of a vertically movable platform by the side of said support, means for stacking lumber on said platform in layers, and automatic means controlled by the stacking mechanism for lowering said platform an amount equal to the thickness of the layer placed on the stack.

57. In a device of the class described, the combination with a support for lumber, of a vertically movable platform by the side of said support, means for stacking lumber on said platform in layers, automatic means controlled by the stacking mechanism for lowering said platform after each layer is placed thereon, and adjustable means for controlling the amount of such lowering.

58. In a device of the class described, the combination with a support for lumber, of a vertically movable platform by the side of said support, means for stacking lumber on said platform in layers, mechanism for raising and lowering said platform, a clutch for operating said mechanism, an arm controlling said clutch, and an endless chain on said stacking means having a projection adapted to engage and turn said arm into operative position.

59. In a device of the class described, the combination with a support for lumber, of a vertically movable platform by the side of said support, means for stacking lumber on said platform in layers, mechanism for raising and lowering said platform, a clutch for operating said mechanism, an arm controlling said clutch, an endless chain on said stacking means having a projection adapted to engage and turn said arm into operative position, and means for changing the effective length of said arm in order to regulate the length of time the clutch will be in operation.

In testimony whereof I affix my signature in presence of two witnesses.

WILLIE GRAHAM.

Witnesses:
 GEO. DAVIS,
 E. H. McCALET, Jr.